US012711439B2

(12) United States Patent
Li et al.

(10) Patent No.: US 12,711,439 B2
(45) Date of Patent: Aug. 18, 2026

(54) DYNAMIC MECHANISM FOR MIGRATING TRAFFIC SPIKES IN A STREAMING MEDIA NETWORK

(71) Applicant: Disney Enterprises, Inc., Burbank, CA (US)

(72) Inventors: Hui Li, Shanghai (CN); Chen Hu Wu, Shanghai (CN)

(73) Assignee: Disney Enterprises, Inc., Burbank, CA (US)

( * ) Notice: Subject to any disclaimer, the term of this patent is extended or adjusted under 35 U.S.C. 154(b) by 101 days.

(21) Appl. No.: 17/550,442

(22) Filed: Dec. 14, 2021

(65) Prior Publication Data

US 2023/0186196 A1 Jun. 15, 2023

(51) Int. Cl.

| | |
|---|---|
| ***G06Q 10/06*** | (2023.01) |
| ***G06F 21/10*** | (2013.01) |
| ***G06F 21/45*** | (2013.01) |
| ***G06Q 10/0631*** | (2023.01) |
| ***G06Q 30/0202*** | (2023.01) |
| ***G06Q 30/0204*** | (2023.01) |
| *G06N 20/00* | (2019.01) |

(52) U.S. Cl.

CPC ..... *G06Q 10/063116* (2013.01); *G06F 21/10* (2013.01); *G06F 21/45* (2013.01); *G06Q 30/0202* (2013.01); *G06Q 30/0204* (2013.01); *G06N 20/00* (2019.01)

(58) Field of Classification Search

None

See application file for complete search history.

(56) References Cited

U.S. PATENT DOCUMENTS

| | | | |
|---|---|---|---|
| 7,882,035 | B2 | 2/2011 | Cottrille et al. |
| 8,272,020 | B2 | 9/2012 | Watson et al. |
| 9,253,051 | B2 | 2/2016 | Phillips et al. |
| 9,282,355 | B2 | 3/2016 | Tiraspolsky et al. |
| 9,538,220 | B2 | 1/2017 | ElArabawy et al. |
| 10,667,019 | B2 | 5/2020 | Pfeffer et al. |
| 10,771,520 | B2 | 9/2020 | Doshi et al. |

(Continued)

OTHER PUBLICATIONS

Almeida et al. (J. M. Almeida, D. L. Eager, M. Ferris and M. K. Vernon, "Provisioning content distribution networks for streaming media," Proceedings. Twenty-First Annual Joint Conference of the IEEE Computer and Communications Societies, New York, NY, USA, 2002, pp. 1746-1755 vol. 3, doi: 10.1109/INFCOM.2002.10194.*

(Continued)

*Primary Examiner* — Matthew D Henry

(74) *Attorney, Agent, or Firm* — Farjami & Farjami LLP

(57) ABSTRACT

A system includes a computing platform having processing hardware and a memory storing software code. The processing hardware executes the software code to receive content data identifying new content and a future release date for the new content, provide a prediction identifying a subset of the users likely to request the new content upon its release, and prioritize, based on the prediction, a schedule for pre-provisioning authentication data for accessing the new content to the subset of users. The processing hardware further executes the software code to pre-provision, using the prioritized schedule, the authentication data to the subset of users prior to the release of the new content.

18 Claims, 4 Drawing Sheets

(56) References Cited

U.S. PATENT DOCUMENTS

| | | | | |
|---|---|---|---|---|
| 10,771,831 | B2 | 9/2020 | Fryer et al. | |
| 2012/0289147 | A1* | 11/2012 | Raleigh | H04N 21/25808 455/3.06 |
| 2015/0012593 | A1* | 1/2015 | Phillips | H04L 41/0894 709/204 |
| 2015/0026468 | A1* | 1/2015 | Riegel | H04L 9/32 713/168 |
| 2018/0373994 | A1* | 12/2018 | Doucette | G06N 7/08 |
| 2019/0200093 | A1* | 6/2019 | Pfeffer | H04L 67/568 |
| 2019/0268644 | A1 | 8/2019 | Fradlis et al. | |

OTHER PUBLICATIONS

"Netflix Launches 'Downloads for you,' a new feature that automatically downloads content you'll like" TechCrunch Feb. 22, 2021.
https://techcrunch.com/2021/02/22/netflix-launches-downloads-for-you-a-new-feature-that-automatically-downloads-content-youll-like/ pp. 1-10.

* cited by examiner

100
Computing Platform 102
104
Processing Hardware
Software Code 116
108
Machine Learning (ML) Model 114
118
System Memory 106
Content Source
150
124
152
132
124
122c
122b
122a
132
Communication Network 130
128a
120a
132
132
120b
132
120c
128c
128b
140a
148a
148b
140b
148c
140c Computing Platform 202
204
Processing Hardware
200
Software Code 216
208
ML Model 214
218
System Memory 206
252
232
224
222
Communication Network 230
232
220
240
Computing Platform 242
Processing Hardware
244
User System Memory 246
222
224
Software Application 254
Media Player 256
224
Display
248

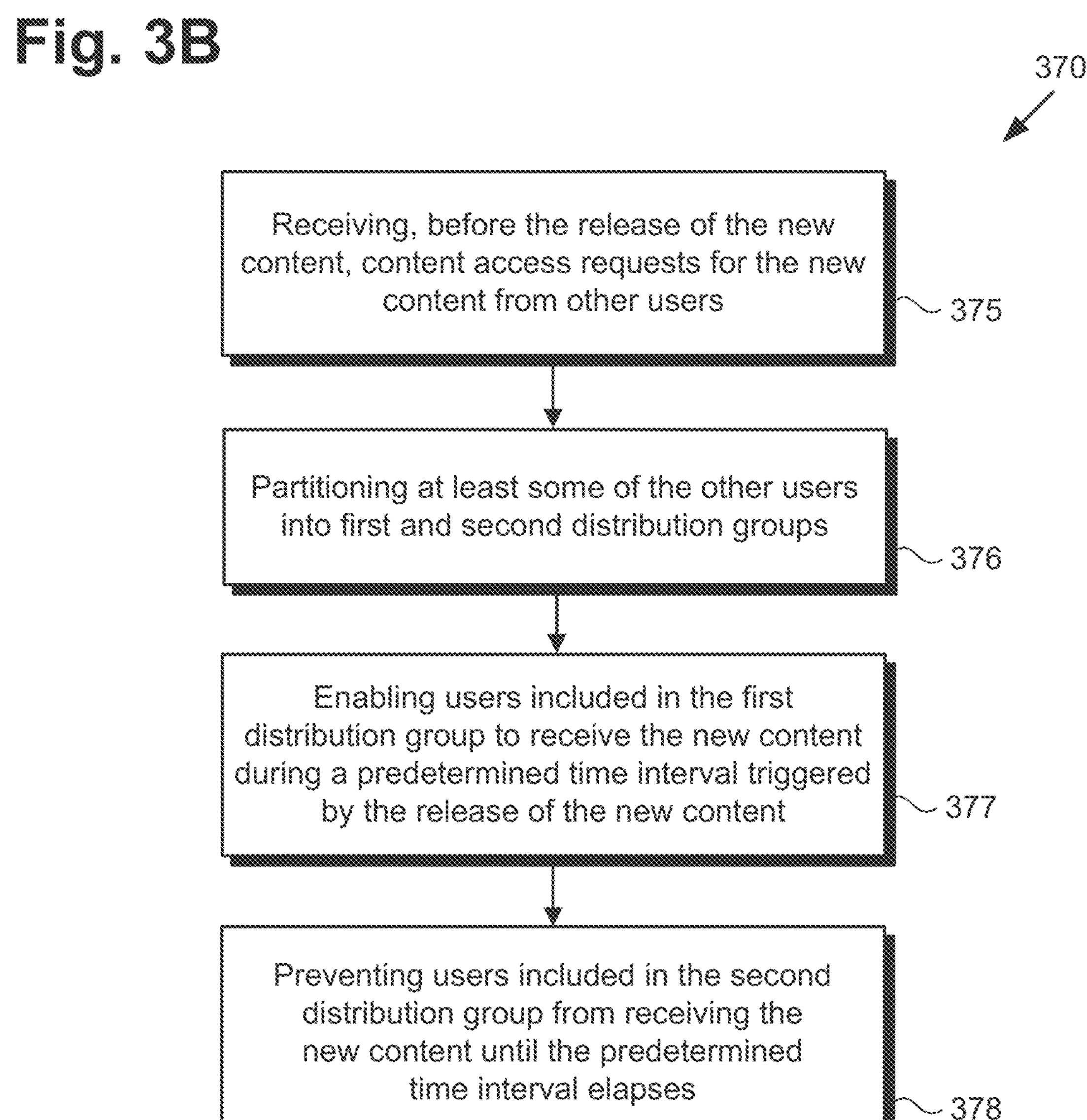
Fig. 3B
370
Receiving, before the release of the new content, content access requests for the new content from other users
375
Partitioning at least some of the other users into first and second distribution groups
376
Enabling users included in the first distribution group to receive the new content during a predetermined time interval triggered by the release of the new content
377
Preventing users included in the second distribution group from receiving the new content until the predetermined time interval elapses
378

DYNAMIC MECHANISM FOR MIGRATING TRAFFIC SPIKES IN A STREAMING MEDIA NETWORK

BACKGROUND

When highly anticipated digital media content is released, such as the latest movie in a popular movie franchise, a new season or episodes of a hit television (TV) show, or an updated version of a popular video game, tens or hundreds of thousands of users may seek to stream that content as soon as it is available. However, having such a large number of users attempting to concurrently access the same content can overload the resources of the streaming platform providing the content, and may result in a number of service failures. For example, once platform traffic starts to exceed capacity, the platform may begin to reject user requests, may exhibit degraded performance, or both. Moreover, if platform traffic spikes to a sufficiently high level, the platform may shut down entirely, resulting in a temporary service outage. Any of these negative consequences of excess demand may take several hours to recover from and may undesirably lead to significant user frustration and disaffection.

BRIEF DESCRIPTION OF THE DRAWINGS

FIG. 3B shows additional exemplary actions for extending the method outlined in FIG. 3A, according to one implementation.

DETAILED DESCRIPTION

Figure 1:
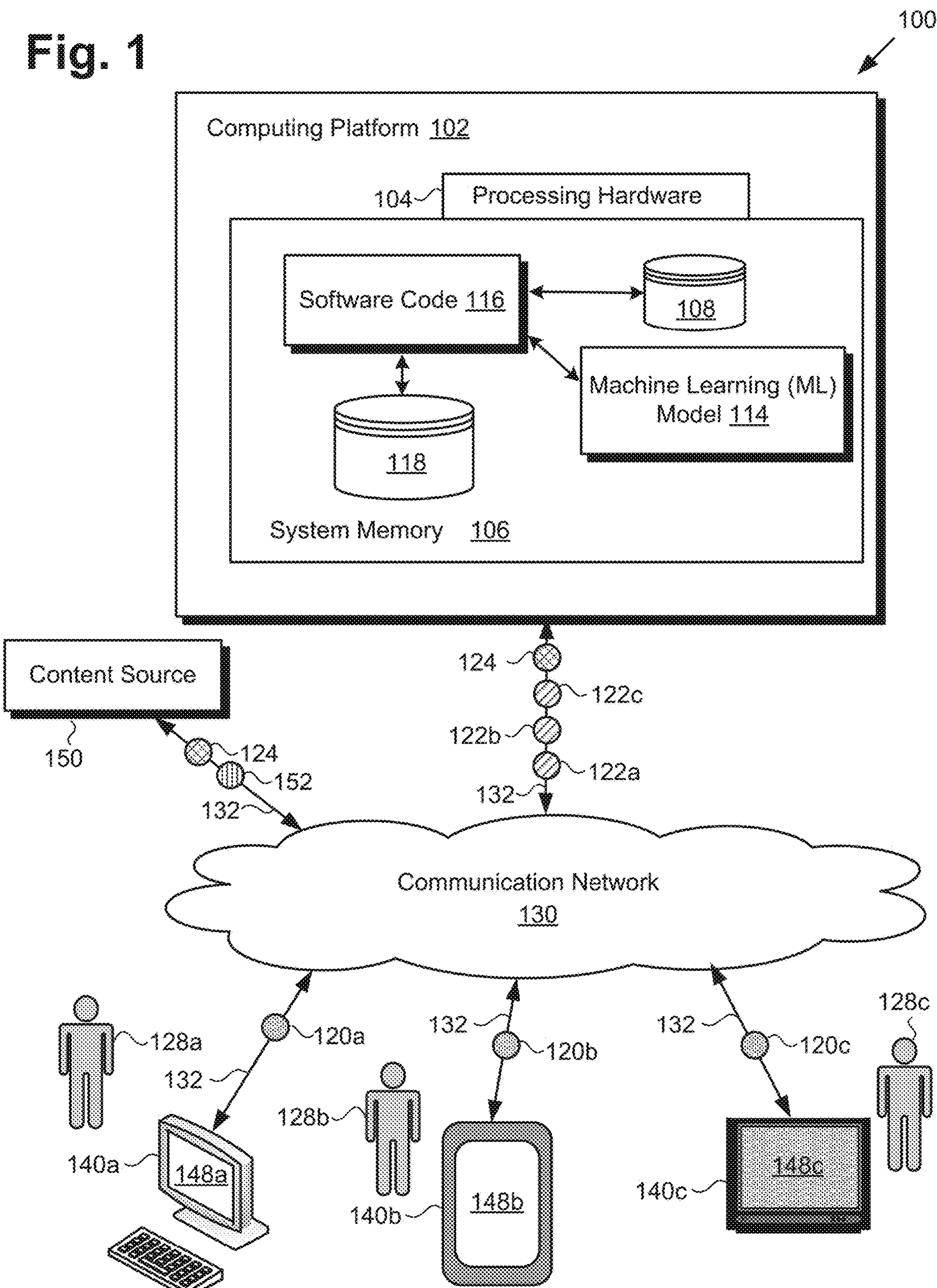
FIG. 1 shows a diagram of an exemplary system for dynamically migrating traffic spikes in a streaming media network, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for dynamically migrating traffic spikes in a streaming media network. It is noted that although the present media content release solution is described below in detail by reference to the exemplary use case in which audio-video (A/V) content having both audio and video components is released, the present novel and inventive principles may be advantageously applied to video unaccompanied by audio, as well as to audio content unaccompanied by video. Moreover, in some implementations, the systems and methods disclosed by the present application may be substantially or fully automated.

As defined for the purposes of the present application, the terms "automation," "automated", and "automating" refer to systems and processes that do not require the participation of a human system administrator. Although in some implementations, a human system administrator may review the performance of the automated systems and methods described herein, that human involvement is optional. Thus, the methods described in the present application may be performed under the control of hardware processing components of the disclosed automated systems.

FIG. 1 shows an exemplary system for dynamically migrating traffic spikes in a streaming media network, according to one implementation. As shown in FIG. 1, system 100 includes computing platform 102 having processing hardware 104 and system 106 implemented as a computer-readable non-transitory storage medium. According to the present exemplary implementation, system memory 106 stores software code 116, and in some implementations, one or more of trained ML model 114, user account database 108, and content database 118.

It is noted that, as defined in the present application, the expression "trained machine learning model" or "trained ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. As used in the present application, any feature identified as an NN refers to a deep neural network. In various implementations. NNs may be trained as classifiers and may be utilized to perform image processing, audio processing, or natural-language processing.

System 100 may be a resource of a subscription video-on-demand (SVOD) service, for example, that streams or otherwise distributes content to consumers, shown in FIG. 1 as users 128*a*, 128*b*, and 128*c*, hereinafter "users 128*a*-128*c*." As further shown in FIG. 1, system 100 is implemented within a use environment including content source 150, which may be an SVOD platform or a content distribution network (CDN) for example, and user systems 140*a*, 140*b*, and 140*c* (hereinafter "user systems 140*a*-140*c*") utilized by respective users 128*a*-128*c* to interact with system 100 via communication network 130 and network communication links 132. In addition, FIG. 1 shows displays 148*a*, 148*b*, and 148*c* (hereinafter "displays 148*a*-148*c*") of respective user systems 140*a*-140*c*, content access requests 120*a*, 120*b* and 120*c* (hereinafter "content access requests 120*a*-120*c*") and authentication data 122*a*, 122*b*, and 122*c* (hereinafter "authentication data 122*a*-122*c*") for respective users 128*a*-128*c*. Also shown in FIG. 1 are new content 124 in the form of streaming media content including at least one of a movie, TV programming content, live streaming of news or a sporting event, or a video game, for example, and content data 152 identifying new content 124 and a future release date for new content 124.

It is noted that in some implementations, as shown in FIG. 1, content database 118 may be stored in system memory 106. However, in other implementations, content database 118 may not be a component of system 100, but may be a feature of content source 150. It is further noted that although FIG. 1 shows three users 128*a*-128*c* of system 100, system 100 may provide media content distribution services, subscription services, or both, to thousands, or millions, of users, for example each having a respective user history stored on user account database 108.

Although the present application refers to software code 116, trained ML model 114, and user account database 108 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

It is further noted that although FIG. 1 depicts software code 116, trained ML, model 114, and user account database 108 as being mutually co-located in system memory 106 that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that software code 116, trained ML model 114, and user account database 108 may be stored remotely from one another within the distributed memory resources of system 100. It is also noted that, in some implementations, trained ML model 114 may take the form of a software module included in software code 116.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 116, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Furthermore, in some implementations, system 100 may be implemented virtually, such as in a data center. For example, in some implementations, system 100 may be implemented in software, or as virtual machines.

It is also noted that, although user systems 140*a*-140*c* are shown variously as desktop computer 140*a*, smartphone 140*b*, and smart television (smart TV) 140*c*, in FIG. 1, those representations are provided merely by way of example. In other implementations, user systems 140*a*-140*c* may take the form of any suitable mobile or stationary computing devices or systems that implement data processing capabilities sufficient to provide a user interface, support connections to communication network 130, and implement the functionality ascribed to user systems 140*a*-140*c* herein. That is to say, in other implementations, one or more of user systems 140*a*-140*c* may take the form of a laptop computer, tablet computer, digital media player, game console, or a wearable communication device such as a smart watch, to name a few examples. Moreover, displays 148*a*-148*c* may take the form of liquid crystal displays (LCDs), light-emitting diode (LED) displays, organic light-emitting diode (OLED) displays, quantum dot (QD) displays, or any other suitable display screens that perform a physical transformation of signals to light.

New content 124 may refer to content that is identified by a user system as being currently unavailable and scheduled for future release. For example, before the release of new content 124, system 100 may provide content data identifying new content 124 and a new content release date, specifying a date and time when user systems may retrieve the identified new content 124 from the content source 150. New content 124 may be streaming digital media content that includes a high-definition (HD) or ultra-HD (UHD) video signal with embedded audio, captions, time code, and other ancillary metadata, such as ratings, parental guidelines, or both. In some implementations, new content 124 may also include multiple audio tracks, and may utilize secondary audio programming (SAP), Descriptive Video Service (DVS), or both, for example. In various implementations, new content 124 may be movie content, TV programming content, e streaming of news or a sporting event, or video game content, to name a few examples. Communication network 130 may take, the form of a packet-switched network, for example, such as the Internet.

Figure 2:
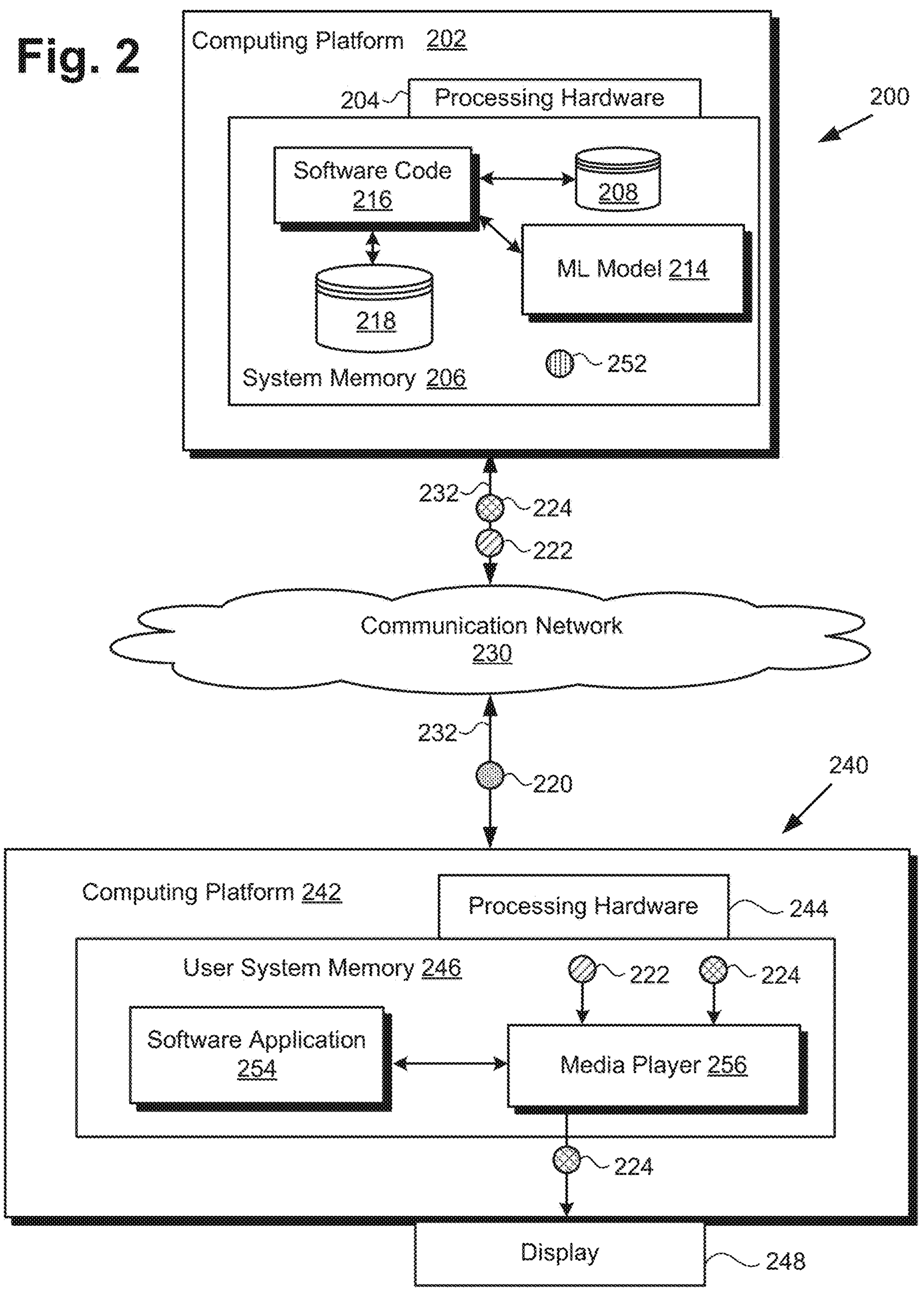
FIG. 2 shows a more detailed diagram of a user system communicatively coupled to the system shown in FIG. 1, according to one implementation.

FIG. 2 shows a more detailed diagram of user system 240 communicatively coupled to system 200 for dynamically migrating traffic spikes in a streaming media network, according to one implementation. As shown in FIG. 2, user system 240 includes user system computing platform 242 having processing hardware 244, user system memory 246 implemented as a computer-readable non-transitory storage medium storing software application 254, media player 256, authentication data 222, and new content 224. User system 240 also includes display 248, which may be physically integrated with user system 240 or may be communicatively coupled to but physically separate from user system 240. For example, where user system 240 is implemented as a smartphone, laptop computer, or tablet computer, display typically be integrated with user system 240. By contrast, where user system 240 is implemented as a desktop computer, display 248 may take the form of a monitor separate from user system computing platform 242 in the form of a computer tower.

As further shown in FIG. 2, user system 240 is utilized in a use environment including system 200, communication network 230, and network communication links 232. System 200 includes computing platform 202 having processing hardware 204 and system memory 206 implemented as a computer-readable non-transitory storage medium storing software code 216, trained ML model 214, user account database 208, and in some implementations, content database 218. Also shown in FIG. 2 are content access request 220, and content data 252 identifying new content 224 and a future release date for new content 224.

System 200 including computing platform 202 having processing hardware 204 and system memory 206 storing software code 216, trained ML model 214, user account database 208, and optional content database 218, corresponds in general to system 100 including computing platform 102 having processing hardware 104 and system memory 106 storing software code 116, trained ML model 114, user account database 108, and optional content database 118, in FIG. 1. In other words, system 200, computing platform 202, processing hardware 204, system memory 206, storing software code 216, trained ML model 214, user account database 208, and optional content database 218 may share any of the characteristics attributed to respective system 100, computing platform 102, processing hardware 104, system memory 106, software code 116, trained ML model 114, user account database 108, and optional content database 118 by the present disclosure, and vice versa.

In addition, communication network 230, network communication links 232, new content 224, and content data 252, in FIG. 2, correspond respectively in general to communication network 130, network communication links 132, new content 124, and content data 152, in FIG. 1. Thus, communication network 230, network communication links 232, new content 224, and content data 252 may share any of the characteristics attributed to respective communication network 130, network communication links 132, new content 124, and content data 152 by the present disclosure, and vice versa. Moreover, content access request 220, in FIG. 2, may correspond to any or all of content access requests 120*a*-120*c*, in FIG. 1, while authentication data 222 may correspond to any or all of authentication data 122*a*-122*c* in FIG. 1.

User system 240 and display 248 correspond respectively in general to any or all of user systems 140*a*-140*c* and respective displays 148*a*-148*c* in FIG. 1. Thus, user systems 140*a*-140*c* and displays 148*a*-148*c* may share any of the characteristics attributed to respective user system 240 and display 248 by the present disclosure, and vice versa. That is to say, like displays 148*a*-148*c*, display 248 may take the form of an LCD, LED display, OLED display, or QD display, for example. Moreover, although not shown in FIG. 1, each of user systems 140*a*-140*c* may include features corresponding respectively to user system computing platform 242, processing hardware 244, and user system memory 246 storing software application 254, media player 256, authentication data 222, and new content 224. It is noted that user system processing hardware 244 may include multiple hardware processing units, such as one or more CPUs, one or more GPUs, one or more TPUs, and one or more FPGAs, for example, as those features are defined above.

Figure 3A:
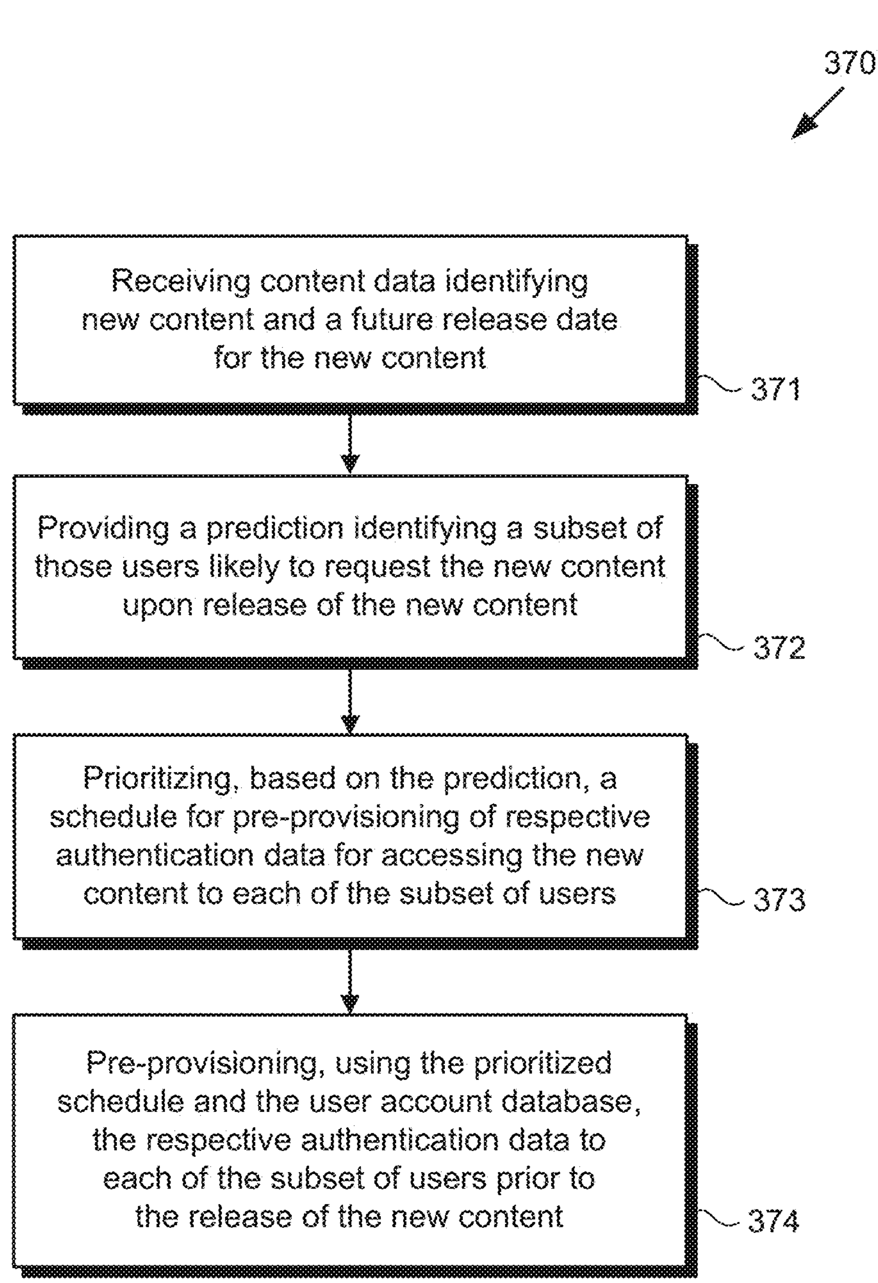
FIG. 3A shows a flowchart outlining an exemplary method for dynamically migrating traffic spikes in a streaming media network, according to one implementation.

The functionality of system 100/200 in FIGS. 1 and 2 will be further described by reference to FIGS. 3A and 3B. FIG. 3A shows flowchart 370 outlining an exemplary method for dynamically migrating traffic spikes in a streaming media network, according to one implementation, while FIG. 3B shows exemplary additional actions for extending the method outlined in FIG. 3A. With respect to the actions outlined in FIGS. 3A and 3B, it is noted that certain details and features have been left out of flowchart 370 in order not to obscure the discussion of the inventive features in the present application.

Referring to FIG. 3A in combination with FIGS. 1 and 2, flowchart 370 begins with receiving content data 152/252 identifying new content 124/224 and a future release date for new content 124/224 (action 371). As noted above, new content 124/224 may include content in the form of one or more of movies, TV programming content, live streaming of news or a sporting event, and video games, to name a few examples. It is noted that new content 124/224 has not yet been released to consumers, such as users 128*a*-128*c* in FIG. 1, by content source 250. Prior to release of new content 124/224, system 100/200 receives content data 152/252 from content source 150 identifying new content 124/224 and its release date. It is noted that, as defined for the purposes of the present application, the expression "release date" refers to the calendar date and time of day that new content 124/224 is to be released for streaming to users 128*a*-128*c*.

As shown in FIG. 1, content data 152 may be received by system 100 from content source 150 via communication network 130 and network communication links 132. Referring to FIGS. 1 and 2 in combination, in those implementations, content data 152/252 may be received by software code 116/216, executed by processing hardware 104/204 of computing platform 102/202.

Flowchart 370 further includes providing a prediction identifying a subset of users likely to request new content 124/224 upon release of new content 124/224 (action 372). Action 372 may be performed by software code 116/216, executed by processing hardware 104/204 of computing platform 102/202, and, in some implementations, may be performed using trained Mt model 114/214 and user histories stored on user account database 108/208.

Trained ML model 114/214 may be an NN, for example, trained to provide the prediction identifying the subset of users likely to request new content 124/224 upon release of new content 124/224 based on a variety of criteria. For example, one such criterion may be the typical time delay between the login time of a particular user and release times for formerly new content that the user has streamed. That is to say, user histories stored on user account database 108/208 may track when a user logs in to system 100 and whether the user attempts to access new content 124/224 before it is released, or views a preview of new content 124/224 before new content 124/224 is released. It is noted that a user who does not attempt to access or preview new content 124/224 prior to its release will may be unlikely to attempt to stream new content 124/224 immediately upon its release.

Alternatively, or in addition, the criteria upon which the prediction provided in action 372 is based may include the content consumption history of a particular user, and whether new content 124/224 shares relevant characteristics, such as genre, characters, or actors, for example, with other content the user has previously consumed. As another alternative, or in addition, users may be clustered into user groups based on their consumption behavior, age, gender, known affinities, and the like. It is noted that a particular user clustered into a user group including other users who have sought to obtain content similar to new content 124/224 upon release of that similar content may be more likely to want to stream or otherwise receive new content 124/224 immediately upon its release. As yet another alternative, or in addition, the criteria upon which the prediction provided in action 372 is based may include whether the user history of a particular user reveals a pattern of streaming other new content as soon as it is released.

Continuing to refer to FIGS. 1, 2, and 3A in combination, flowchart 370 further includes prioritizing, based on the prediction provided in action 372, a schedule for pre-provisioning of authentication data 122*a*-122*c*/222 for accessing new content 124/224 to each of the subset of users identified as likely to request new content 124/224 upon its release (action 373). It is noted that, as defined for the purposes of the present application, the expression "pre-provisioning" refers to supplying an asset, in the present use cases authentication data 122*a*-122*c*/222 for accessing new content 124/224 of new content 124/224 itself, prior to the "release date" of new content 124/224, as that expression is defined above. Authentication data 122*a*-122*c*/222 may include authentication credentials for a respective one of the subset of users identified in action 372, as well as playback data for new content 124/224. For example, referring to FIG. 1, authentication data 122*a* may correspond to user 128*a* and may include authentication credentials for user 128*a* as well as playback data for new content 124. Analogously, authentication data 122*b* may correspond to user 128*b* and may include authentication credentials for user 128*b* as well as playback data for new content 124, and so forth.

It is further noted that authentication credentials included in authentication data 122*a*-122*c*/222 may include one or more digital rights management (DRM) licenses or CDN tokens, for example. Playback data for new content 124/224 may include one or more playlists for new content 124/224. It is further noted that, in some implementations, the authentication credentials and playback data included authentication data 122*a*-122*c*/222 may be encrypted. In those implementations, authentication data 122*a*-122*c*/222 may further include a decryption key and a usage rule prohibiting use of the decryption key to decrypt the authentication credentials and the playback data prior to the release of new content 124/224. Prioritizing the schedule for pre-provisioning of authentication data 122*a*-122*c*/222 in action 373 may be performed by software code 116/216, executed by processing hardware 104/204 of computing platform 102/202.

In some implementations, processing hardware 104/204 may execute software code 116/216 to prioritize the schedule for pre-provisioning of authentication data 122*a*-122*c*/222 to each of the subset of users identified in action 372 further based on the respective user histories of each of those users. In addition, or alternatively, processing hardware 104/204 may execute software code 116/216 to prioritize the schedule for pre-provisioning of authentication data 122*a*-122*c*/222 to each of the subset of users identified in action 372 further based on the respective geo-locations of those users. For example, users distant from system 100/200 may receive scheduling priority over users located closer to system 100/200.

Another example use case in which the geo-location of a user may affect how the schedule for pre-provisioning of authentication data 122*a*-122*c*/222 to that user is prioritized may be live streaming of a sporting event for which a predictive factor for the likelihood that the user will attempt access that content immediately upon its release may include the location of the user (e.g., the city in which the user lives) and the relevance of that location to the teams or individual competitors engaged in the sporting event. Such location criteria may analogously affect the pre-provisioning scheduling priority for news, such as a "pre-scheduled" breaking news event that is particularly relevant to a certain location or region, such as a city, state, or country. For example, a live stream of a news event announcing a jury verdict may be prioritized for users residing in the region affected by the legal case or legal issues being determined, while a state-of-the-union type address may prioritized for residents of the country serving as the focus of the address, and so forth.

It is noted that the factors or criteria used combination to provide the prediction action 372, to prioritize the schedule for pre-provisioning of authentication data 122*a*-122*c*/222 in action 373, or both may be weighted. Moreover, the weights applied to those criteria may be adjusted over time to improve the performance of system 100/200 in orchestrating release of content, such as new content 124/224.

Thus, in order to efficiently perform pre-provisioning, system 100/200 is configured to predict whether a particular user will demand new content 124/224 as soon as it, is released, i.e., during a spike in demand. That prediction may be based on a weighted hybridization mechanism that combines several factors or criteria to evaluate the possibility that a particular user will demand new content 124/224 during a release spike. The factors can also include the gap between a user's general login time and content release time. For example system 100/200 may track a user's first login time and content launch time each day. If a user normally does not login or launch before the content release time, he or she will be unlikely to try to access new content 124/224 immediately upon its release. The factors may also include the watching history of a user. For example, system 100/200 may calculate the relevance between new content 124/224 and the user's previously watched content to predict whether the user is likely to find new content 124/224 desirable. The factors can also include a user group factor in which a user is grouped with others based on their behavior, age, gender, hobby, and the like. If a user belongs to a group in which most of the group like new content 124/224 and have watched similar content upon release, the user is also likely to watch the content immediately upon release. The factors can also include a last watch factor: i.e., whether a user had tried to watch a similar title or previous episode immediately upon its release. The factors can also include a geography factor, as noted above, to determine priority based on a user's geo-location. For example, and as also noted above, a user located far away from system 100/200 should have higher priority, while for new/content 124/224 released at the same time globally, a user located in a region in which it is midnight or very early in the morning should have lower priority. The priority of each user can be calculated as follows: Priority=Factor1*Weight1+Factor2*Weight2+ . . . Factor"N"*Weight"N", where the weights can be adjusted based on feedback from previous predictions.

Flowchart 370 further includes pre-provisioning, using the schedule prioritized in action 373, authentication data 122*a*-122*c*/222 to each of the subset of users identified in action 372, prior to the release of new content 124/224 (action 374). For example, as noted above by reference to FIG. 1, authentication data 122*a* may correspond to user 128*a* and may include authentication credentials for user 128*a*. Thus, action 374 may include obtaining authentication credentials for user 128*a* from user account database 108, and transmitting authentication data 122*a* including those authentication credentials, as well as playback data for new content 124, to user system 140*a* via communication network 130 and network communication links 132.

Analogously, action 374 may also include obtaining authentication credentials for user 128*b* from user account database 108, and transmitting authentication data 172*b* including those authentication credentials, as well as playback data for new content 124, to user system 140*b* via communication network 130 and network communication links 132, and so forth. Referring to FIGS. 1 and 2 in combination with FIG. 3A, the pre-provisioning of authentication data performed in action 374 enables each of the subset of users identified in action 372 to access new content 124/224 immediately upon the release of content 124/224. In other words, action 374 enables the subset of users identified in action 372 to receive new content 124/224 concurrently.

Referring to FIG. 2, system 200 may be configured to pre-provision user system 240 with authentication data 222, which includes playback information for new content 224, minutes or hours before new content 224 is scheduled for release. By way of example, when the user of user system 240 refreshes the product detail page (PDP) for new content 240 during a predetermined time window prior to its release, system 200 can covertly pre-provision the necessary playback data for new content 224 as part of authentication data 222. As noted above, that playback data may be encrypted and bound with a usage rule that the playback data can only be decrypted at or after the release date and time for new content 224. At or after that release time, when the user of user system 240 activates media player 256, software application 254 may check user system memory 246 for the presence of pre-provisioned authentication data 222, consult the usage rule governing decryption, and decrypt the authentication credentials and playback data included in authentication data 222 using the provided decryption key.

Referring to FIGS. 1 and 2 in combination, in implementations in which system 100/200 is a resource of an SVOD service, for example, the majority of the SVOD streaming platform load that is imposed by a user request to stream content results from the process of authenticating the user, obtaining playback data for the content, and obtaining the necessary license or CDN token. However, by pre-provisioning authentication data 122*a*-122*c*/222 including those assets, as disclosed by the present application, the present solution for orchestrating content release advantageously enables a user to request the content stream for new content 124/224 directly from the CDN, without adding to the processing overhead of the SVOD streaming platform.

In some implementations, in addition to pre-provisioning the subset of users identified in action 372 with authentication data 122*a*-122*c*/222, processing hardware 104/204 may execute software code 116/216 to pre-provision new content 124/224 to that subset of users. For example, referring to FIG. 1, processing hardware 104 may execute software code 116 to obtain new content 124 from content database 118 or content source 150, and may download new content 124 to one or more of user systems 140*a*-140*c* via communication network 130 and network communication links 132.

In some implementations, the method outlined by flowchart 370 may conclude with action 374 described above. However, in other implementations, as shown by FIG. 3B, the method outlined by flowchart 370 may include additional actions. For example, in some implementations, flowchart 370 may further include receiving, before the release of new content 124/224, content access requests 120*a*-120*c*/222 for new content 124/224 from users other than the subset of users identified in action 372 (action 375), and partitioning at least some of those other users into a first distribution group and a second distribution group (action 376).

Actions 375 and 376 may be performed by software code 116/216, executed by processing hardware 104/204 of computing platform 102/202. It is noted that the partitioning of the other users into the first distribution group and the second distribution group may be based on a variety of different factors. Examples of such factors include subscription status, the accumulation by a user of affinity credits, respective geo-locations of the other users, or any business rules applied to partitioning of users. As a specific but non-limiting example, for use cases in which the first distribution group receives new content 124/224 before the second distribution group, users having a premium, e.g., advertisement (ad) free, subscription to an SVOD service may be partitioned into the first distribution group, while users having a lower tier ad supported subscription may be partitioned into the second distribution group.

Continuing to refer to FIG. 3B in combination with FIGS. 1 and 2, flowchart 370 may further include enabling the users included in the first distribution group to receive new content 124/224 during a predetermined time interval triggered by the release of new content 124/224 (action 377), and preventing users included in the second distribution group from receiving new content 124/224 until the predetermined time interval elapses (action 378). The predetermined time interval during which the users included in the second distribution are prevented from receiving new content 124/224 may be a few seconds, may be tens of seconds but less than one minute, or may more than one minute, such as two to three minutes for example.

Actions 377 and 378 may be performed by software code 116/216, executed by processing hardware 104/204 of computing platform 102/202, and advantageously further serve to reduce the load on a streaming platform when new content 124/224 is released. For example, where twenty percent (20%) of the other users from whom content access requests 120*a*-120*c*/222 are received in action 375 are partitioned into the first distribution group and 70% of those users are partitioned into the second distribution group, the peak load on the streaming platform may be advantageously reduced to between 50% and 60% of the peak streaming platform load in the absence of partitioning.

With respect to the method outlined by flowchart 370, it is noted that actions 371, 372, 373, and 374 (hereinafter "actions 371-374"), or actions 371-374, 375, 376, 377, and 378, may be performed in an automated process from which human participation may be omitted.

Thus, the present application discloses systems and methods for dynamically migrating traffic spikes in a streaming media network. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for dynamically migrating traffic spikes in a streaming media network, the system comprising:

a computing platform including a processing hardware and a system memory;

the system memory storing a software code;

a machine-learning (ML) model having a deep neural network (NN) trained, using content consumption histories and demographic data associated with a plurality of user accounts, to identify one or more of the plurality of user accounts likely to request content upon release;

the processing hardware configured to execute the software code to:

receive content data identifying a new content and a future release date for the new content;

provide a prediction, using the ML model, based on a weighted combination of a plurality of previous actions by respective users of the plurality of user accounts, wherein one of the plurality of previous actions included in the weighted combination is a previous attempt to access or preview another content before release of the another content, the prediction identifying a subset of the plurality of user accounts likely to request the new content on or after the future release date;

prioritize, based on the prediction, a schedule for pre-provisioning of respective authentication data for accessing the new content to each user account of the subset of the plurality of user accounts; and pre-provision, using the prioritized schedule, the respective authentication data to a user system of a user corresponding to each user account of the subset of the plurality of user accounts by transmitting the respective authentication data to the user system prior to the future release date of the new content, the respective authentication data including authentication credentials for a respective one user account of the subset of the plurality of user accounts and playback data for the new content, the playback data including one or more playlists for the new content, the authentication credentials and the playback data being encrypted and constrained by a usage rule preventing decryption prior to the future release data;

wherein pre-provisioning of the respective authentication data reduces a processing overhead of a streaming platform providing the new content, on the future release date, by enabling the user system to authenticate and obtain the playback data locally without contacting the streaming platform upon release of the new content, and wherein a performance of the system to dynamically migrate the traffic spikes in the streaming media network is improved by adjusting one or more weights of the weighted combination used to provide the prediction.

2. The system of claim 1, wherein the respective authentication data enables each user account of the subset of the plurality of user accounts to receive the new content concurrently.

3. The system of claim 1, wherein the processing hardware is further configured to execute the software code to:

cluster, based on respective user histories of each of the plurality of user accounts, another subset of the plurality of user accounts into a user group; and provide, using the trained ML model, the prediction identifying the subset of the plurality of user accounts likely to request the new content upon release of the new content further based on the user group.

4. The system of claim 1, wherein the processing hardware is further configured to execute the software code to:

prioritize the schedule for pre-provisioning of the respective authentication data to each user account of the subset of the plurality of user accounts further based on respective user histories of each user account of the subset of the plurality of user accounts.

5. The system of claim 1, wherein the processing hardware is further configured to execute the software code to:

prioritize the schedule for pre-provisioning of the respective authentication data to each user account of the subset of the plurality of user accounts further based on respective geo-locations of each user account of the subset of the plurality of user accounts.

6. The system of claim 1, wherein the respective authentication data includes a decryption key.

7. The system of claim 1, wherein the processing hardware is further configured to execute the software code to:

provide, using the prioritized schedule, the new content to each user account of the subset of the plurality of user accounts prior to release of the new content to other user accounts.

8. The system of claim 1, wherein the processing hardware is further configured to execute the software code to:

receive, before the future release date of the new content, a plurality of content access requests for the new content from another plurality of user accounts;

partition at least some of the other plurality of user accounts into a first distribution group and a second distribution group;

enable user accounts included in the first distribution group to receive the new content during a predetermined time interval triggered by the future release date of the new content; and prevent user accounts included in the second distribution group from receiving the new content until the predetermined time interval elapses.

9. The system of claim 1, wherein the new content comprises streaming media content including at least one of a movie, television (TV) programming content, or a video game.

10. A method for use by system including a machine-learning (ML) model having a deep neural network (NN) trained, using content consumption histories and demographic data associated with a plurality of user accounts, to identify one or more of the plurality of user accounts likely to request content upon release, to dynamically migrate traffic spikes in a streaming media network, the method comprising:

receiving content data identifying a new content and a future release date for the new content;

generating, using the ML model, based on a weighted combination of a plurality of previous actions by respective users of the plurality of user accounts, wherein one of the plurality of previous actions included in the weighted combination is a previous attempt to access or preview another new content before release of the another new content, a prediction identifying a subset of the plurality of user accounts likely to request the new content on or after the future release date;

prioritizing a schedule for pre-provisioning of respective authentication data for accessing the new content to each user account of the subset of the plurality of user accounts; and pre-provisioning, based on prioritizing, the respective authentication data to a user system of a user corresponding to each user account of the subset of the plurality of user accounts by transmitting the respective authentication data to the user system prior to the future release date of the new content, the respective authentication data including authentication credentials for a respective one user account of the subset of the plurality of user accounts and playback data for the new content, the playback data including one or more playlists for the new content, the authentication credentials and the playback data being encrypted and constrained by a usage rule preventing decryption prior to the future release data;

wherein pre-provisioning of the respective authentication data reduces a processing overhead of a streaming platform providing the new content, on the future release date, by enabling the user system to authenticate and obtain the playback data locally without contacting the streaming platform upon release of the new content, and wherein a performance of the system to dynamically migrate the traffic spikes in the streaming media network is improved by adjusting one or more weights of the weighted combination used to provide the prediction.

11. The method of claim 10, wherein the respective authentication data enables each user account of the subset of the plurality of user accounts to receive the new content concurrently.

12. The method of claim 10, further comprising:

clustering, based on respective user histories of each of the plurality of user accounts, another subset of the plurality of user accounts into a user group; and providing, using the trained ML model, the prediction identifying the subset of the plurality of user accounts likely to request the new content upon release of the new content further based on the user group.

13. The method of claim 10, further comprising:

prioritizing the schedule for pre-provisioning of the respective authentication data to each user account of the subset of the plurality of user accounts further based on respective user histories of each user of the subset of the plurality of user accounts.

14. The method of claim 10, further comprising:

prioritizing the schedule for pre-provisioning of the respective authentication data to each user account of the subset of the plurality of user accounts further based on respective geo-locations of each user account of the subset of the plurality of user accounts.

15. The method of claim 10, wherein the respective authentication data includes a decryption key.

16. The method of claim 10, further comprising:

providing, using the prioritized schedule, the new content to each user account of the subset of the plurality of user accounts prior to the release of the new content to other user accounts.

17. The method of claim 10, further comprising:

receiving, before the future release date of the new content, a plurality of content access requests for the new content from another plurality of user accounts;

partitioning at least some of the other plurality of user accounts into a first distribution group and a second distribution group;

enabling user accounts included in the first distribution group to receive the new content during a predetermined time interval triggered by the future release date of the new content; and preventing user accounts included in the second distribution group from receiving the new content until the predetermined time interval elapses.

18. The method of claim 10, wherein the new content comprises streaming media content including at least one of a movie, television (TV) programming content, or a video game.

* * * * *